UNITED STATES PATENT OFFICE.

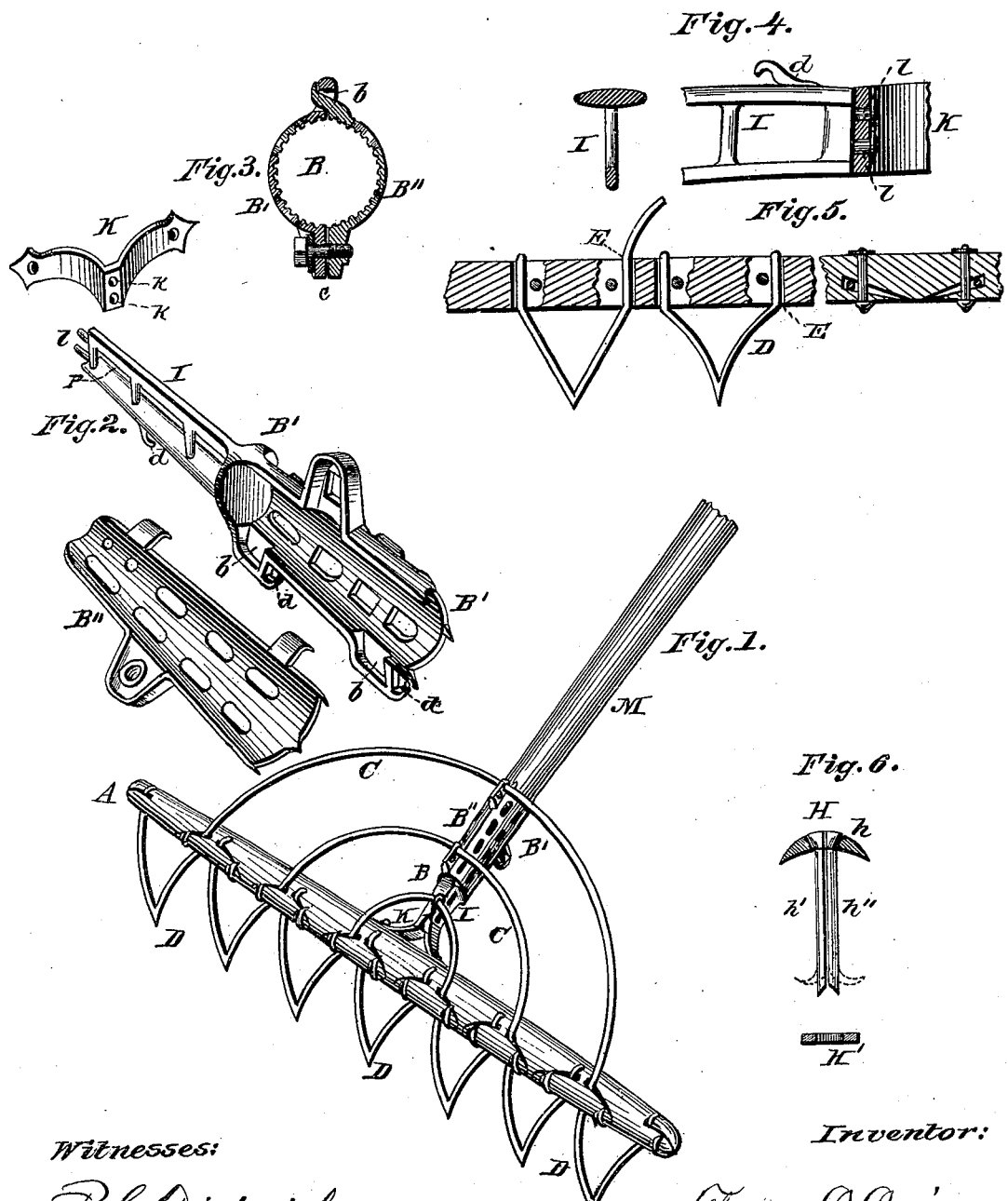

THEODORE D. DAVIS, OF SYRACUSE, NEW YORK, ASSIGNOR TO JULIA H. DAVIS, OF SAME PLACE.

HAND-RAKE.

SPECIFICATION forming part of Letters Patent No. 250,040, dated November 22, 1881.

Application filed September 23, 1880. (No model.)

*To all whom it may concern:*

Be it known that I, THEODORE D. DAVIS, a citizen of the United States, residing at Syracuse, in the county of Onondaga and State of New York, have invented certain new and useful Improvements in Hand-Rakes designed principally for hay and grain or field-rakes, of which the following is a specification.

My invention relates to improvements in hand-rakes; and it consists in, first, a combination of the teeth and braces, which are made of metal, and extending them through slits in the head, and forming double-wire teeth on the ends thereof; second, in constructing a head with oblique slits in the side and longitudinal slits in the ends, in which the teeth are secured; third, in a compact combination of the several parts.

Heretofore rakes have been made with wooden teeth and braces, which are liable to shrink and loosen, and also to break. They have also been made with teeth of a double wire. These, being largest at the end, stick in the substances raked by them. They have also been made with double-wire teeth with parallel sides, in the form of staples. These are also faulty, as they will not readily enter nor free themselves from the matter operated on, it clogging and sticking fast between the parallel edges of the staples. They have also been made of solid metal heads and teeth. These are expensive and heavy, and liable to foul and clog.

The object of my invention is, first, to construct teeth of such form that they will easily enter and free or clean themselves from the matter operated on; second, to combine the teeth with the braces, head, and socket in such a manner that they will be strong, light, durable, easily made, and not very liable to be bent or broken; third, in combining a compound or sectional socket with the head, braces, and handle, from which the handle may be easily detached and a new one substituted, in case of breakage, or otherwise, and for convenience in storing and shipping. I attain these objects in the manner shown in the accompanying drawings, in which—

Figure 1 is a perspective view. Fig. 2 is a perspective view of the socket, shank, and brace detached, and shown bottom up. Fig. 3 is a cross-section of the socket and clamp. Fig. 4 shows a cross-section and a longitudinal section of the shank. Fig. 5 is a detailed view of the teeth, with sections of the head, showing the shape of the teeth and the oblique slits in which the legs of the teeth are secured. Fig. 6 is a sectional view of the compound nail for securing the teeth.

Similar letters of reference refer to similar parts throughout the several views.

The head A, preferably of wood, and socket B, of metal, constitute the frame of the implement, to which the teeth, braces, and handle are secured. In the head A, Fig. 1, are slits, in which the legs of the teeth are secured by compound nails inserted at right angles to the legs and clinched, as shown by the dotted lines in Fig. 6. The nails are placed a short distance from the legs, thereby securing a great leverage, holding the teeth firmly by compressing the wedge-shaped portions of the head firmly against the legs of the teeth. The wire, preferably of steel, and about No. 12 in size, of which the teeth and braces are made, is first inserted in the longitudinal slit in the end of the head. The end of the wire is bent over. The tooth is then made by bending the wire around a form of the shape of the tooth, inserting the wire into the first oblique slit, then bending the wire over close to the top of the head, thence to the center of the top of the socket near the end, placing it through, between, or under a malleable clamp or clamps that are integral with the socket, and are riveted or clinched firmly over the brace, thereby securing the center of the brace. The wire is then run to the oblique slit near the other end of the head and a tooth formed like the first one, making a combined brace and tooth, as shown at C and D, Fig. 1. The second and third series are made in the same manner. The fastening devices are now inserted with the hookhead embracing the wedge portion of the rakehead outside of the slits. They are then driven through the rake-head against a solid die or form and bent over in opposite directions, firmly securing the whole. The wire for the middle tooth is then inserted, the tooth formed, the ends bent over and secured by two rivets passing through the head and also through the ends of the socket-shank, securing also the socket to the head. The teeth are formed in the shape of a curvilinear triangle, as shown at D, Fig. 5, which is a detailed view. The spaces between the teeth are narrower than the bases or spaces between the legs of the teeth, for the purpose of dividing or averaging the legs of the teeth in such a manner as will best retain the matter operated on; also requiring less teeth. The legs of two approximate teeth may be placed in the same slit, if desirable. The curvilinear form admits of its being easily inserted into or through the matter operated on. The great angle of the edges of the teeth admits of its easily clearing itself. The angles formed by the bending of the teeth and braces, as shown at E, Fig. 5, prevent the teeth from moving either way in the direction of their length.

The compound nail H (shown in Fig. 6) is composed of a head, $h$, with a conical or tapering hole through the center, in which are inserted two pieces, $h'$ $h''$, with tapering heads fitting the opening in the head $h$, the ends being pointed for clinching. The sections of the nail may be prevented from spreading by the washer H', placed over the end of the nail before clinching.

The socket for connecting the head and handle is shown in Figs. 2, 3, and 4. The socket B, or bed for the handle, is in the form of a section of a cylinder, and made of malleable cast-iron. It may be made straight, or it may be tapered in either direction. The handle is secured by a section of the same form, forced or drawn against the opposite side in a transverse direction to the handle. This may be accomplished by a band or bands secured to the section B', on the opposite side of which may be set-screws, wedges, or cams for pressing against the loose section; or the loose section may be drawn toward the section B' by means of a band with an extension on one side passing through the part B', secured with a nut, or slotted and secured with a key or otherwise. Preferable is the plan shown in Figs. 2 and 3, in which the loose section B'' is supplied with a hinge or hooks, $b$ $b$, at each end, and secured by a single screw-clamp, $c$, in the center on the opposite side. The interior surfaces of the socket are indented, as shown in Fig. 3, a portion of the surface of the handle partially entering the indentations when the handle is compressed by the screw, thus firmly securing the same.

Combined with the section B' is the shank I, (shown in cross-section in Fig. 4,) for connecting the socket with the head. The shank I is cast with and forms an extension of the section B' of the socket, to which the bifurcated brace K is secured by a lug or lugs, $l$, which are inserted in the perforations $k$ $k$ and firmly riveted. The brace K is cast in a single piece, and by this mode of connecting the parts the holes may all be cast, thereby saving the labor of drilling and greatly simplifying the process of molding and casting. The shank is made in a T, H, or X form, which gives it great strength with the least weight. Openings P, or indentations, are made in the shank, and also in the socket, for the purpose of diminishing the weight and to secure a light and ornamental appearance.

What I claim is—

1. In combination, the rake-head composed of a single piece provided with oblique and longitudinal slits, substantially as shown, the braces C and teeth D, fastening devices for securing the teeth, and clamps for securing the braces to the socket, as and for the purpose set forth.

2. In a hand-rake, the compound socket B, composed of separate sections B' B'', adapted to be hinged together and clamped on the handle, and provided with a shank, I, substantially as set forth.

3. In a garden implement, the compound handle-socket B, composed of separate sections B' B'', hinges $b$ $b$, and clamps $c$, and provided with a shank, I, substantially as set forth.

4. In a hand-rake, the malleable socket B, having a hook or lip integral therewith, in combination with brace C, whereby the brace is held firmly in the socket, substantially as set forth.

5. In a hand-rake, a wire tooth the two edges thereof bent from the rake-head to the point in curved lines, forming two sides of a curvilinear triangle, substantially as shown and described.

6. In a hand-rake, the nail or rivet H, composed of head $h$, having a conical opening, and pieces $h'$ $h''$, constructed as described, whereby the teeth and braces may be clamped to the head, substantially as set forth.

7. The shank I, having lugs $l$, in combination with bifurcated brace K, perforated as shown, whereby the shank and brace may be riveted together, as and for the purpose set forth.

8. In combination, the head A, teeth D, braces C, socket B, shank I, handle M, and fastening devices, substantially as set forth.

THEODORE D. DAVIS.

Witnesses:
WM. C. DOANE,
JNO. K. HAYS, Jr.